Oct. 10, 1933.  W. D. WILCOX  1,929,664
PROCESS OF OBTAINING CARBON BLACK AND A GASEOUS MIXTURE OF HYDROGEN
AND NITROGEN IN CONTROLLED PROPORTIONS BY THE THERMAL
DISSOCIATION OF HYDROCARBON GASES AND VAPORS
Filed June 28, 1930
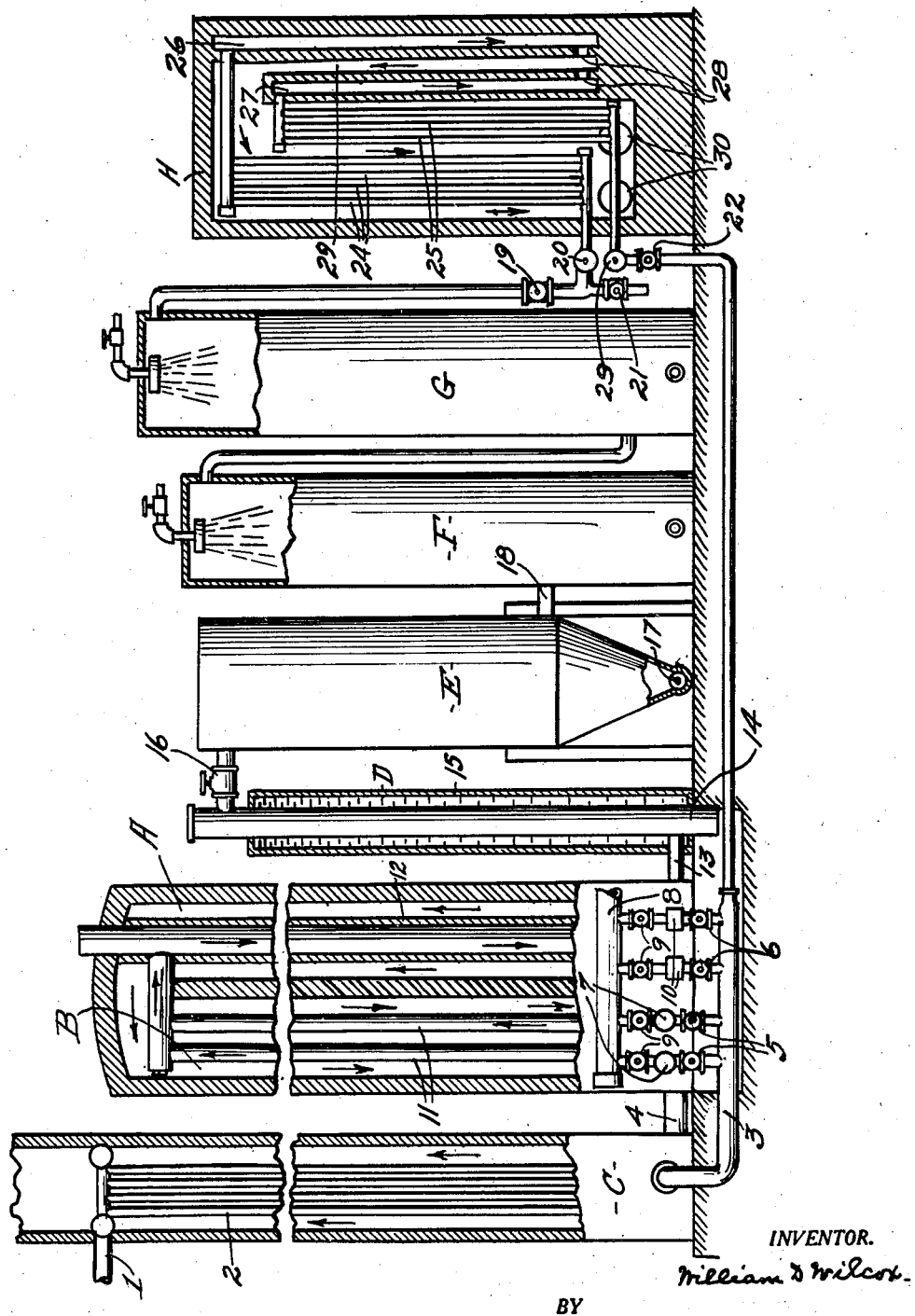
INVENTOR.
William D. Wilcox.
BY
ATTORNEY.

Patented Oct. 10, 1933

1,929,664

UNITED STATES PATENT OFFICE 1,929,664

PROCESS OF OBTAINING CARBON BLACK AND A GASEOUS MIXTURE OF HYDROGEN AND NITROGEN IN CONTROLLED PROPORTIONS BY THE THERMAL DISSOCIATION OF HYDROCARBON GASES AND VAPORS

William D. Wilcox, Lawrence, Kans.

Application June 28, 1930. Serial No. 464,691

8 Claims. (Cl. 23—7)

Numerous patents have been issued covering plant and process for the recovery of carbon and/or hydrogen by the thermal dissociation of hydrocarbon gases or vapors, derived from oil. In some, external heating is employed; in others, the hydrocarbons are passed in contact with incandescent coke or with checker brick brought to a high temperature by precedent blasting. In none so far as I have been able to ascertain has there been obtained along with recovery of carbon, a mixture of the hydrogen residue with nitrogen from the air freed from its oxygen, in the proportions required for use of the mixture in the synthesis of ammonia, nor has dissociation actually been carried to the completion necessary to give freedom from the presence in the mixture of undecomposed hydrocarbons.

In one, at least, the value of the hydrogen for the special purpose for which it was produced, has justified such a long time of contact as permitted a reduction of the hydrocarbons to less than 5%, but so long a time of contact would not, generally speaking, be commercially practicable. Many have named temperatures above that at which, equilibrium being established, the percent of hydrocarbons present would be negligible, but more often than otherwise, the means provided for creating and maintaining these temperatures has been inadequate. Nor has there been complete success in the recovery of the carbon. Much the larger portion has remained within the dissociation zone and not recovered, or if later removed by mechanical means, has been so sintered together by long exposure to heat, that the fineness of subdivision which is its chief element of value, has been greatly impaired. The process is preferably carried out either in a single unit or in a multi-stage procedure in plant such as shown by the accompanying drawing which is filed and made a part of these specifications, but the essential features of the process may be carried out in plant departing in many details from that of the preferred form shown by the drawing.

In the drawing, A may be called the dissociation chamber; B, the preheating chamber; C, a heat exchange chamber; D, shows means of reducing the temperature of the hot gas passing in through 13; E, is an electric precipitator; F, a scrubber which may be used for further cooling and cleaning the gas following removal of the carbon; G, is an oil absorption scrubber which may be used for the recovery of condensible polymerization products; H, is the chamber in which final dissociation is effected.

I do not limit myself in the operation of the process to the use of any particular means of cooling the gas and removing the entrained carbon. F and G may not be needed and I may use other forms of plant commonly known and used for the removal of liquid hydrocarbons. What is new in my process will be found in A, B, C and H. Means are provided for maintaining an active combustion in the base of A by the admission of fuel gas through 9—9 from 8, and air through 6—6 from 3 into burners 10—10. The combustion gases pass up A, and down B, thence through 4 into C and to the air. Air under pressure admitted through 1 passes down through 2 into 3, simultaneously gas through 9 or air through 5 may be admitted to 11, passed up through B and down through 12 in A, thence through 13, D, E, F and G, for the removal of carbon and products of thermal dissociation other than gas. In H, valve controlled pipe 19, admits gas, valve controlled pipe 21 admits steam to manifold pipe 20, 24 is a system of pipes in H conveying gas to vertical conduit 26. Valve controlled pipe 22 conveys air from 3 to manifold pipe 23, conveying air through system of pipes 25 to vertical conduit 27, 28 indicates openings admitting gas and air to the base of combustion chamber 29, 30 are outlet pipes for the product withdrawn from H.

Heating is by external means, the attainment of an adequate temperature being facilitated by the use of air preheated in a heat exchange with the combustion gases, to support the burning of combustible gas. Active combustion is in the lower portion of what I call the dissociation chamber A. The hot gases pass up through the dissociation chamber, down through adjacent preheating chambers B and B' and into the heat exchange C. The travel of the gases which it is sought to dissociate is counter current to the travel of the heating gases. The gases to be dissociated are passed through tubes or conduits preferably of heat resisting alloy except that in the zone of highest heat, refractory materials may be substituted in the walls of the conduit. I find that increase of carbon recovered may be effected by increasing the height of the conduit in which dissociation takes place, so that the required time of heating may be given to the gas and at the same time a higher velocity than has been employed in the past. I find a further gain in preventing adherence of the carbon to the inner surfaces of the conduit by maintaining an excess of pressure in the main pipe supplying gas, so that the velocity of travel of the gas may be increased periodically for brief intervals. This may appear a very obvious means of effecting the result stated, but I do not find that it has ever been employed or proposed prior to my use of it.

Following passage through the dissociation zone, the gas may be cooled and the carbon removed by well-known means. The entire process may be carried out in one unit such as shown in drawing, by introducing air along with the gas either in initial mixture or preferably in separate conduits during their passage through the preheating chamber, bringing them to temperatures in excess of that at which ignition occurs and uniting them prior to their entering the dissociation zone. While the proportion of air is much less in all cases than sufficient to form an explosive mixture, when so preheated, union of the oxygen of the air with the hydrocarbons takes place. For simplicity of illustration I will assume the gas treated to be a pure methane. 5 cu. ft. of $CH_4$ are united with 5 cu. ft. of air. The reactions may be represented by the equation $5CH_4 + O_2 + 4N_2 + heat$ equals $3C + 2CO + 10H_2 + 4N_2$. There is generated by the union $C + O = CO$, 36 B. t. u. per cu. ft. in excess of that required to effect the dissociation of the $CH_4$ molecule, but as the dissociation of each cu. ft. of $CH_4$ to $C + 2H_2$ which absorbs around 105 B. t. u. per cu. ft., a substantial addition of heat must be supplied from the combustion gases, through the walls of the conduit in order that the temperature of the hydrocarbon gases be maintained and the reactions proceed rapidly and to completion. Because of the difficulty of maintaining the necessary high temperature, but chiefly in order to obtain a better quality of carbon, I may elect to carry out dissociation without the addition of air and to complete it in a two-stage procedure the temperature of the second unit being much higher than is maintained in the first, removing the carbon by means immediately following the issuance of the gases from the dissociation zone of each.

Assuming a dissociation of approximately 90% to have been attained, 10 cu. ft. of $CH_4$ has become 1 cu. ft. $CH_4$ and 18 cu. ft. of $H_2$. This mixture is conveyed into the dissociation unit shown in vertical cross section in Fig. 3. This unit is heated initially by internal combustion so that air and gas, admitted in determined volume through separate inlets and conveyed through a preheating zone, are brought to temperatures much in excess of that at which the oxygen of a volume of air inadequate to form an explosive mixture will unite with the gas upon mixture taking place. I find the temperature required to bring about this union of the oxygen in the air with the combustible of the gas to be in the neighborhood of 1300° F. This procedure may be carried out in plant differing materially in design from that shown by the drawing and I do not limit myself in carrying out this final step of the process to plant of the preferred design.

Some advantage will be gained in preventing a deposit of carbon from the gas on the interior of the conduit during its passage through the externally heated conduit, shown in Fig. 3, prior to its union with air by adding a small proportion of steam to the gas. This is by no means essential to the result sought but will be good practice.

Let us assume the gases and air heated to 1300°. We add to the gas air as indicated by the following:

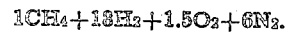

This following combination will equal

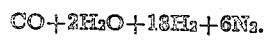

Knowing the composition of the hydrocarbons and the degree of dissociation, the gas and air may readily be proportioned so as to approximate the volumetric ratio of hydrogen and nitrogen desired. $C + O = CO$ generates 38 B. t. u. per cu. ft. in addition to the heat required to dissociate the molecule of $CH_4$. $H_4 + O_2 = 2H_2O$ generates 548 B. t. u. net 2 cu. ft. of hydrogen being consumed. Adding the heat so generated to a gaseous mixture already preheated to 1300° F. and a temperature less than 3000° F. only by reason of the increased specific heat of gases at high temperatures will result. This is a temperature which it would be difficult to create by external means or to impart for more than a brief operating interval by contact with surfaces brought to high temperature by precedent blasting. The highly heated mixture passes out counter current and in contact with the exterior surfaces of the pipes which are bringing in the unheated air and gas, and is fully adequate to bring them to the desired temperature of preheat prior to their passage into the chamber where they are brought together. The reactions taking place within the dissociation unit supply the high temperature necessary to dissociate the remaining hydrocarbons. It appears quite clear that by reason of the much higher temperature of the gaseous mixture which results from the procedure described than has been employed in the past or stipulated in prior issued patents directed to the accomplishment of the complete dissociation of hydrocarbon gases, and by reason of the greater affinity for carbon than for hydrogen which is displayed by oxygen at high temperatures, the residue of hydrocarbons in the gas following its union with the air, will be completely decomposed. The addition of steam to the gas prior to its passage through H will be found to accelerate dissociation. This may be introduced in the way shown in the drawing, or may be very conveniently added by a water spray employed to cool the gas in place of the external cooling effected in D. Means of removing the oxides of carbon and of further purifying the gaseous mixture issuing from 30—30 are well known and need not be described.

What I claim as new and desire to protect by the issuance to me of Letters Patent, is:

1. The steps in the process of obtaining carbon black and a mixture of hydrogen and nitrogen in controlled proportions, which comprises effecting a partial dissociation of hydrocarbon gases by passing them through the interior of a conduit, heated to progressively higher temperatures by the contact of combustion gases, flowing counter current in contact with the exterior of the conduit, partially cooling the gases issuing from the conduit, and removing the entrained carbon therefrom, adding steam to the gas and passing it through an externally heated conduit, thereby bringing it to a temperature in excess of 1300° F., simultaneously passing a controlled proportion of air through an externally heated conduit, heating it to a temperature in excess of 1300° F., intimately mixing the gas and air and discharging the resultant gases in contact with and in counter current flow with the exterior surfaces of the conduits, through which the gas and air were introduced.

2. The process of obtaining carbon black and a mixture of hydrogen and nitrogen in controlled proportions, which comprises simultaneously preheating a volume of hydrocarbon gases and a closely proportioned volume of air less than sufficient to form an explosive mixture to an ignition temperature, by passing them through conduits heated by the passage of hot combustion gases passed counter current to the direction of travel of the gas and air, in contact with the exterior surfaces of the conduits, bringing the gas and air so preheated into admixture in a conduit heated to a temperature at which a substantially complete dissociation of the hydrocarbons will be effected, cooling the gases, removing the entrained carbon therefrom, and eliminating the oxides of carbon from the mixture of gases.

3. The process of obtaining carbon black and a mixture of hydrogen and nitrogen in controlled proportions by the dissociation of hydrocarbon gases and vapors, which comprises heating a conduit to a dissociation temperature by the contact of combustion gases passed from one extremity of the conduit to a discharge outlet at the other extremity, simultaneously passing hydrocarbon gases through the conduit in a direction reverse to the travel of the combustion gases, so controlling the temperature and length of travel as to secure dissociation at a velocity of travel of the hydrocarbon gases through the conduit as substantially overcomes the tendency of the evolved carbon to adhere to the interior walls of the conduit, removing the carbon entrained in the gas issuing from the conduit, then passing the gas through a conduit enclosed in a heating chamber, bringing it to a temperature in excess of 1800° F., simultaneously passing a volume of air in such relation to the volume of gas as will supply the desired proportion of nitrogen in the conserved product through a conduit within the heating chamber and bringing it to a temperature in excess of 1800° F., uniting the gas and air within a combustion chamber and withdrawing the product gas through the heating chamber in contact with the exterior surfaces of the enclosed conduit and in counter current flow with the travel of the gas and air, withdrawing the product gas and removing the oxides of carbon therefrom.

4. The process of obtaining carbon black and a mixture of hydrogen and nitrogen in controlled proportions, which comprises passing hydrocarbon gases through a conduit heated by external means to a temperature at which dissociation of the hydrocarbon gases will be substantially complete, concurrently admitting air in a volume less than sufficient to form an explosive mixture and in volume sufficient to supply to the product the proportion of nitrogen desired at an intermediate point in the travel of the gas through the conduit, withdrawing the resultant product gas, cooling it and removing the entrained carbon, removing the oxides of carbon from the gas.

5. The steps in the process of obtaining carbon black and a mixture of hydrogen and nitrogen in controlled proportions by the dissociation of hydrocarbon gases and vapors, following a partial dissociation of the hydrocarbon gases by heating them to a dissociating temperature in the absence of air or steam, and the removal of the evolved carbon from the gas, which comprises adding a small proportion of steam to the gas and passing it through a conduit enclosed in a heating chamber, and bring it to a temperature in excess of 1800° F., concurrently passing a volume of air to proportioned relation to the volume of gas as to supply the desired proportion of nitrogen through a conduit enclosed in the heating chamber, and bringing it to a temperature in excess of 1800° F., uniting the gas and air in a combustion chamber and withdrawing the product gas through the heating chamber in contact with the exterior surfaces of the conduit therein.

6. The process of obtaining carbon black and a mixture of hydrogen and nitrogen in controlled proportions, which comprises passing hydrocarbon gases and vapors through a conduit brought to a dissociation temperature by external combustion, partially cooling the product gas and removing the entrained carbon, thereafter heating it to a temperature in excess of 1300° F., simultaneously heating a volume of air less than sufficient to form an explosive mixture and in such proportion relative to the volume of gas as to supply the proportion of nitrogen desired to a temperature in excess of 1300° F., uniting the gas and air in a combustion chamber, withdrawing the product gas and removing the oxides of carbon.

7. The process of obtaining carbon black and a mixture of hydrogen and nitrogen in controlled proportions, which comprises adding to a volume of hydrocarbon gas a volume of air less than sufficient to form an explosive mixture and in sufficient volume to supply the desired proportion of nitrogen, passing the mixture through a conduit placed within an enclosing combustion chamber, the interior surfaces of which are heated to a temperature at which a substantially complete dissociation is effected, withdrawing the product gas, removing the entrained carbon and thereafter removing the oxides of carbon.

8. The improvement in the process of obtaining carbon black, together with a mixture of hydrogen and nitrogen in controlled proportions by the passage of hydrocarbon gases through a conduit, heated by external means, to a dissociating temperature, which comprises adding to the hydrocarbon gases prior to subjecting them to a dissociating temperature within the conduit, a volume of air less than sufficient to form an exposive mixture and so proportioned relative to the volume of hydrocarbon gases as to supply the desired proportion of nitrogen in the product gas.

WILLIAM D. WILCOX.